No. 790,528. PATENTED MAY 23, 1905.
J. B. SALO & A. H. HOAG.
WEIGHING MECHANISM FOR REFRIGERATORS.
APPLICATION FILED APR. 2, 1904.
3 SHEETS—SHEET 1.
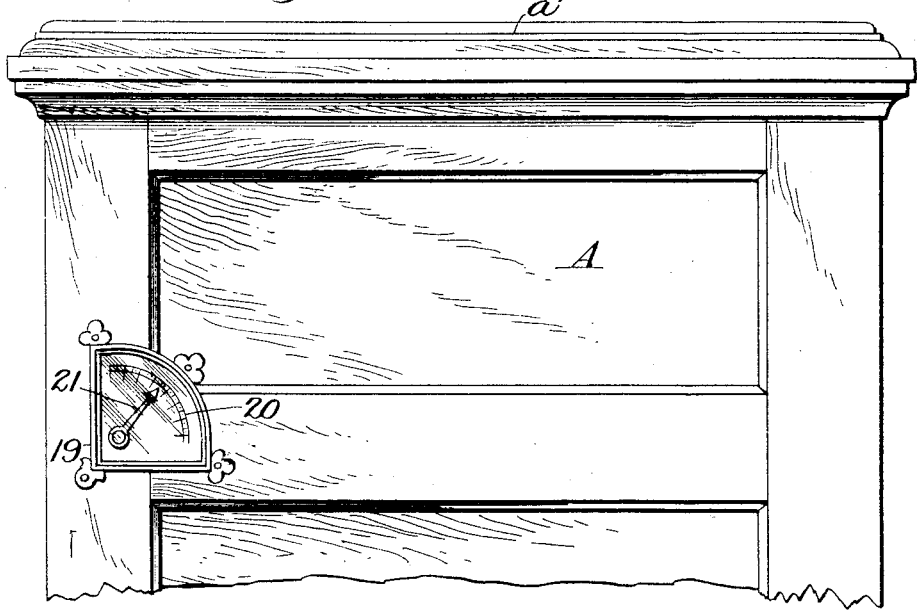
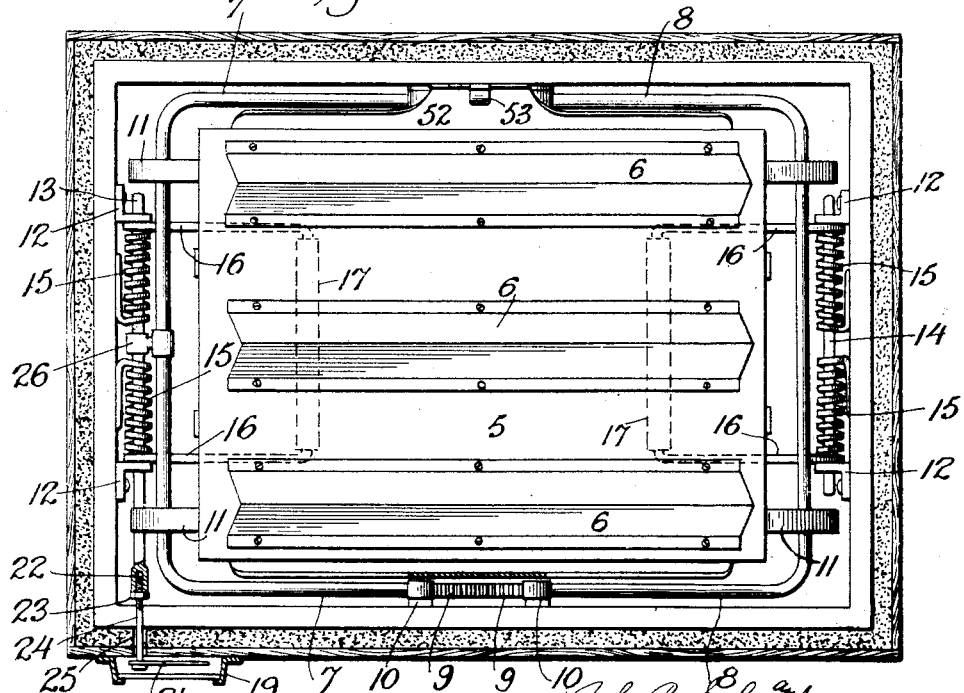

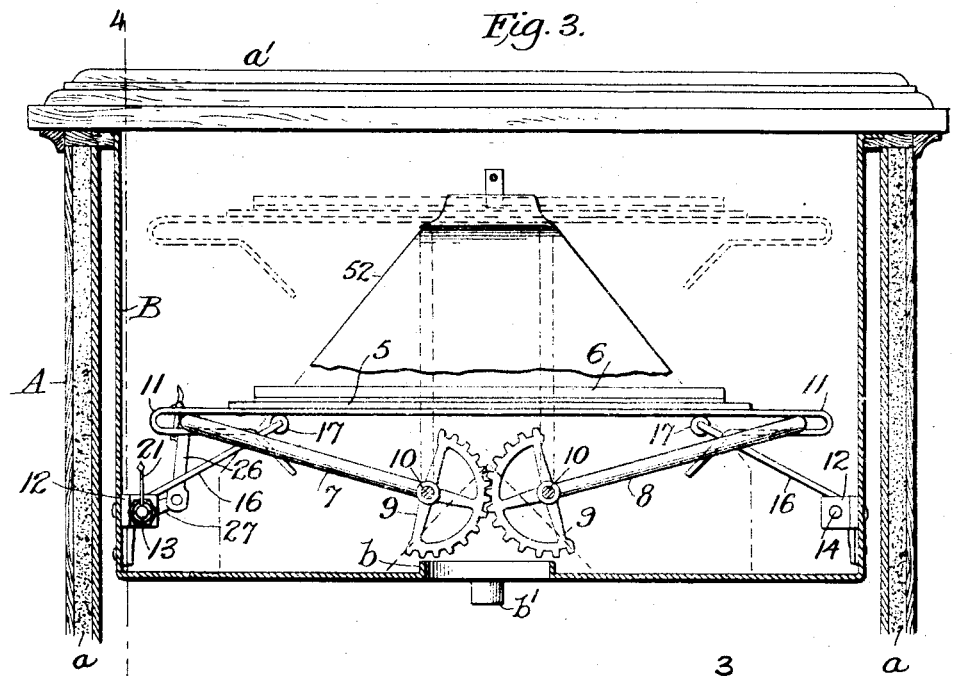
Fig. 3.
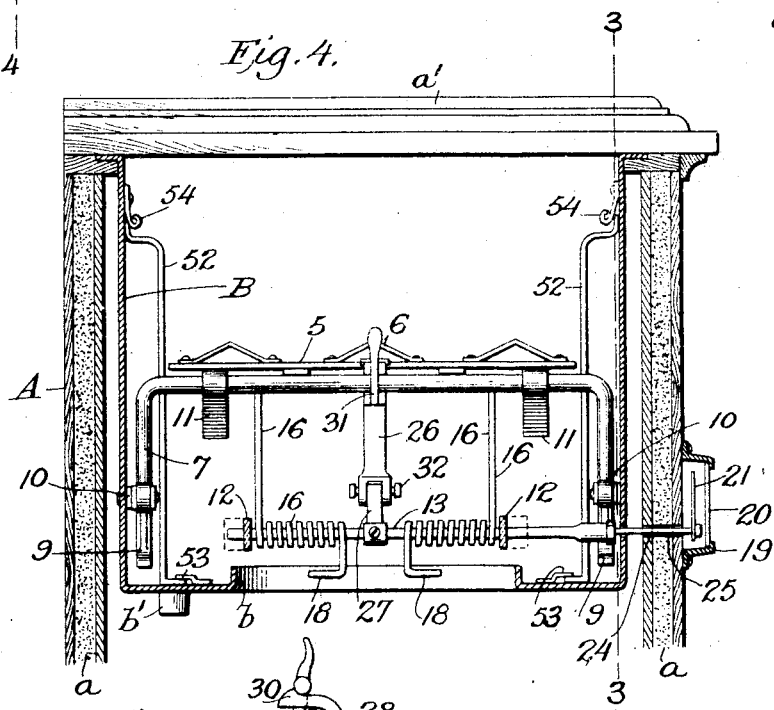
Fig. 4.
Fig. 5.

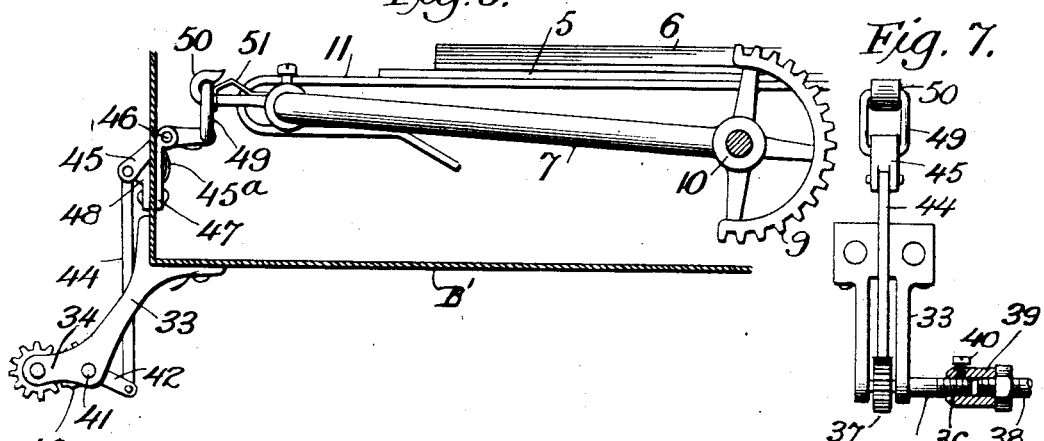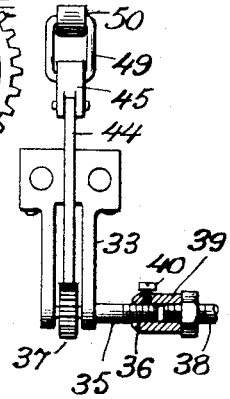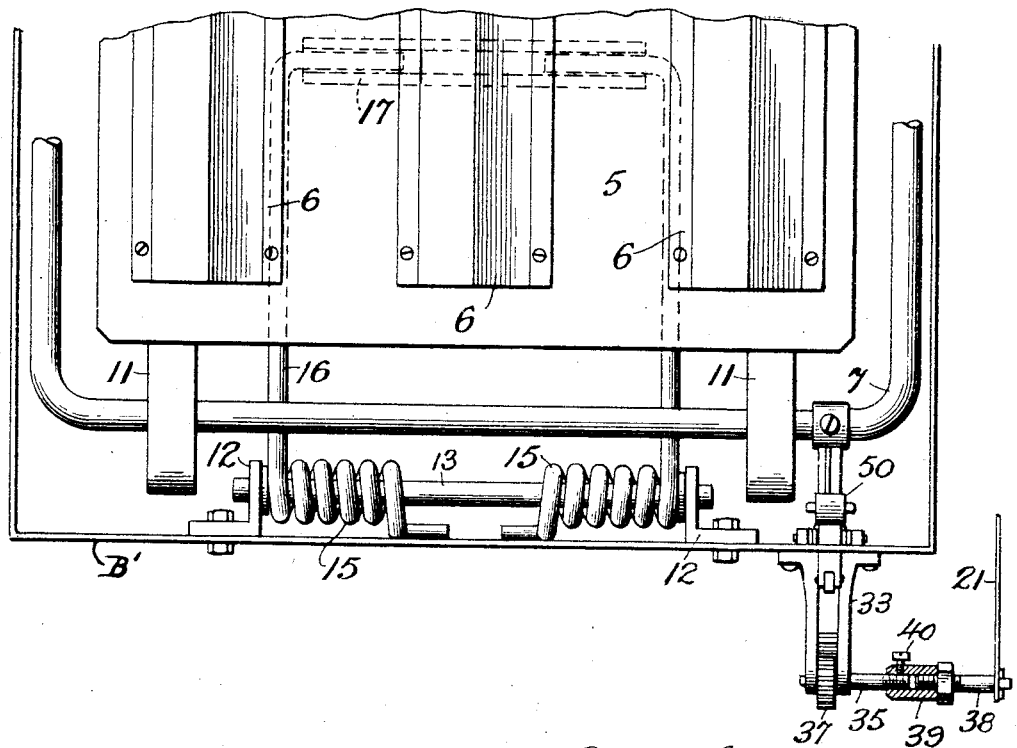

No. 790,528. Patented May 23, 1905.

UNITED STATES PATENT OFFICE.

JOHN B. SALO AND ANDREW H. HOAG, OF NEW YORK, N. Y.

WEIGHING MECHANISM FOR REFRIGERATORS.

SPECIFICATION forming part of Letters Patent No. 790,528, dated May 23, 1905.

Application filed April 2, 1904. Serial No. 201,327.

*To all whom it may concern:*

Be it known that we, JOHN B. SALO and ANDREW H. HOAG, citizens of the United States, and residents of the city of New York, borough of Manhattan, in the county of New York and State of New York, have invented certain new and useful Improvements in Weighing Mechanisms for Refrigerators, of which the following is a full, clear, and exact description.

In weighing mechanisms for use on refrigerators of different styles, such as those having ice-doors in the front or a cover in the top, it is necessary to locate the visible scale and the pointer in a position where they may be used on different kinds of refrigerators without interference with the door or the top. It is also desirable to dispense with a slot or opening of comparatively large size, in which slot the pointer-carrier is adapted to travel.

Among other objects we seek to produce in this invention a simple construction by which the foregoing ends may be secured.

We also provide a construction which permits an ice-platform to be withdrawn at will and allows ready access to be obtained to the several parts for thoroughly cleaning them.

Another feature of our invention is the provision of an improved ice-platform, which allows free drainage of a body of water and overcomes the retention of a body of water in which a cake of ice has a tendency to melt quite rapidly.

Our improved weighing mechanism has its parts constructed and arranged in a very compact manner to take up a small amount of room in the upper part of the refrigerator, and the new mechanism is efficient and reliable in operation, so that the housekeeper may ascertain at a glance the quantity of ice deposited in the refrigerator or the quantity of ice remaining therein at any time.

Further objects and advantages of the invention will appear in the course of the subjoined description, and the actual scope thereof will be defined by the annexed claims.

Reference is to be had to the accompanying drawings, forming a part of this specification, wherein like characters of reference are used to indicate corresponding parts in all the figures.

Figure 1 is a front elevation of a portion of one style of refrigerator with the indicating devices of our improved weighing mechanism applied thereto. Fig. 2 is a horizontal sectional plan view through the refrigerator, illustrating the weighing mechanism. Fig. 3 is a vertical longitudinal section in the plane of the dotted line 3 3 of Fig. 4. Fig. 4 is a vertical cross-sectional elevation on the line 4 4 of Fig. 3. Fig. 5 is a detail view illustrating a detachable connection between the ice-platform and the spring-actuated rock-shaft which controls the scale-pointer. Fig. 6 is a vertical sectional elevation through a part of a weighing mechanism, with the springs removed and adapted for use on that class of refrigerators having an ice-door in the front thereof. Figs. 7 and 8 are views in side elevation and in plan, respectively, of the parts shown by Fig. 6.

In the accompanying drawings we have shown weighing mechanism for two styles of refrigerators, the one shown by Figs. 1 to 4, inclusive, having a hinged top or cover $a'$, while in Figs. 6 to 8, inclusive, the weighing mechanism is designed for use in connection with refrigerators having an ice-door in the front thereof. The casing A of the refrigerator is shown as having a packing $a$, of non-conducting material.

It is to be understood that our weighing mechanism may be used in connection with refrigerators of any style or class, and we do not limit ourselves to the use of said mechanism on refrigerators of the classes herein illustrated nor to any particular kind of refrigerator.

We will first describe the construction shown by Figs. 1 to 5, inclusive. Within the upper part of the refrigerator is suspended or supported an ice tank or tray B, the latter having in its bottom a flanged opening $b$, and from the bottom of this tank leads a drain-pipe $b'$, as is usual in the art.

One element of the weighing mechanism is a platform 5, the same being arranged in a horizontal position within the ice tray or tank B and adapted for movement vertically therein. This tray is provided on its upper side with a plurality of cleats 6, each consisting of a length or strip of metal bent to an approximately V shape in cross-section and fastened in an inverted position on the upper side of the platform. Any desired number of these cleats may be used—two, three, or more, as preferred—and said cleats are arranged in parallel order, so as to provide gutters through which the water is free to drain from the platform. The use of the cleats also prevents the ice from sliding off the platform toward the guards or shields 52, and the cleats add strength to the platform.

The platform is maintained in a level position at all times by the employment of the equalizer-bails 7 8, each consisting of a crossbar and two arms. The arms of each bail are provided at their ends with gear-segments 9, and the segments of said bails are pivoted at 10 to the respective sides of the ice-tank and at such points as to make them have intermeshing engagement. (See Figs. 2 and 3.) The two equalizer-bails are thus combined for simultaneous and equal movement in a manner to permit the platform to have a limited vertical travel within the ice-tank and to support said platform in a level position at all times.

The platform and the bail are connected detachably by any suitable means for the purpose of permitting the removal of the platform from the ice-tank when it is desired to clean the refrigerator. As one means for connecting the platform detachably to the pair of bails we have shown said platform as being equipped with clips 11, which project beyond the ends of the platform and are fitted around the cross-bars of the bails, as shown by Figs. 2 and 3. The bails and the platform may be lifted by hand to the raised position (indicated by dotted lines in Fig. 3) for the purpose of making the bails swing toward each other, and thus withdraw the cross-bars from the clips, whereby the platform may be lifted off the bails and out of the refrigerator.

On the inside of the tank B, at the end portions thereof, we provide the bearing blocks or lugs 12, the same being arranged in pairs, and in the construction of Figs. 1 to 4, inclusive, these lugs support the horizontal rock-shaft 13 and the rod or arbor 14 at the respective ends of the tank. Around the shaft 13 and the arbor 14 are fitted coiled springs 15, and movable with each spring is a pressure device which is in coöperative relation to the platform. The pressure devices are at the respective ends of the platform, and they are in the form of bails or arms 16, the cross-bars of which lie below the end portions of the platform. The spring and the pressure-bail at each end of the platform are made in one piece by bending a heavy piece of wire or a spring-rod to form the bail and then coiling the end portions of the bail to produce the springs, as shown by full and dotted lines in Fig. 2; but, if desired, each coil of the spring may be made with a bent arm to produce a part of the bail, whereby the spring and bail for each end of the platform may be made in two pieces, as shown in full and dotted lines in Fig. 8.

To minimize the frictional engagement between the cross-bar of the pressure device and the platform, we provide a sleeve or roller 17, which is fitted on the bar or the arms of each pressure-bail, said sleeve having rolling engagement with the under side of the platform.

The arbor 14 at one end of the ice-tank is allowed to remain at rest and serves merely as a support for one spring and the pressure-bail thereof; but the shaft 13 is mounted to rock or turn in its bearings 12. This shaft is connected by suitable devices with the platform in order that rocking motion may be given positively thereto on the rising-and-falling motion of the platform 5. With the rock-shaft 13 is associated a visual indicating device of the weighing mechanism, and in the embodiment of this indicating device (shown by Figs. 1, 2, and 4 of the drawings) we employ a suitable housing or casing 19, which is provided with a graduated quadrant or scale 20, the latter being traversed by an index or pointer 21. This housing is fastened to the outside of the refrigerator on the front thereof and close to one side edge of the structure, so as to lie out of the way of the ice door or doors which may be provided in the front of the refrigerator.

The rock-shaft 13 has one end extended a suitable distance beyond a lug 12, and it is provided at this end with a threaded socket 22, into which is screwed a revoluble pointer-pin 24; the latter having a jam-nut 23, which is screwed up against the end of the rock-shaft, so as to make the pointer-pin fast therewith. It is quite objectionable to make a long slot in the refrigerator-casing, because manufacturers do not desire to carry in stock a large quantity of refrigerators with slots for the weighing mechanism and another quantity of ordinary refrigerators which are not to be equipped with weighing mechanisms, and, furthermore, the slots are unsightly, unsanitary, and allow the admission of air. To overcome these defects, we provide a small hole or passage 25 at the proper place in the refrigerator, and through this hole passes the revoluble pointer-pin 24, which is fast with the shaft 13 and carries the pointer 21.

As one means for rocking the shaft 13 on the rising-and-falling motion of the platform we provide an arm 26 and a link 27. The arm is formed with a hook 28, having a slot 29, the free end of the hook being yieldable and provided with a cam-shaped lug 30. In this slot is arranged a latch 31, which is pivoted to the arm and arranged to ride on the cam-lug of the hook, said latch extending across the throat of the hook. The lower end of the arm has lugs, in which are mounted the pivot-screws 32, that engage with the link 27, the latter being made fast to the rock-shaft 13 and having pivotal connection through the screws with the arm 26. This construction makes the shaft 13 rock or turn with the rising or falling motion of the platform, so as to cause the pointer to traverse the dial, and the hook-shaped arm 26 provides for the detachable connection of the arm to the cross-bar of one bail, 7, that supports one end of the platform, whereby the latch 31 may be thrown over and the hooked arm disconnected from the bail when it is desired to remove the platform.

In refrigerators having one or more ice-doors in the front thereof we find it is necessary to modify the construction in a way to actuate the visual indicator devices by a limited travel of the platform and to drop the indicator mechanism below the bottom of the ice-tank, the cooler-tank, and the faucet of the latter tank. This limited travel of the platform is desirable in order that it may not rise when unloaded to such a height above the bottom of the door-opening as to prevent the easy introduction of a cake of ice through the door-opening in the front of the refrigerator. The indicator mechanism is lowered below and to one side of the ice-door to prevent the latter from interfering with the indicator, and this requires that the operating means for the indicator shall be so arranged inside of the refrigerator as to be placed below the tank and in the space between the refrigerator-casing and the end portion of said tank. According to this embodiment of the invention a hanger 33 is fixed to the lower corner of the ice-tank B' so as to depend therefrom, said hanger having a slotted or forked foot 34. In suitable bearings of this hanger-foot is journaled a horizontal indicator-shaft 35, which lies below and to one side of the member 13, the latter constituting a support for one of the springs 15 and the pressure-bail associated therewith. Said indicator-shaft is provided with a threaded end portion 36 and with a gear or toothed segment 37, the latter being arranged in the slotted foot 34. (See Fig. 7.) The indicator-pin 38 passes through a hole or passage provided in the casing at a proper point to allow the visual indicator to occupy an exposed position and out of the path of the front ice-door, and this pin is screwed into a coupling-sleeve 39, the latter being screwed on the threaded end 36 of the shaft 35 and made fast thereto by a set-screw 40. A pivotal pin or arbor 41 is mounted in another part of the slotted hanger-foot 34, and on it is fulcrumed a short lever 42, the latter having a gear-segment 43, which meshes with the gear or segment of the indicator-shaft. To the free end of the lever 42 is pivoted a link 44, extending upwardly outside of the tank B' and having its upper end pivoted to one arm of the angular lever 45. This lever passes through a short slot 46 in the ice-tank, and it is fulcrumed on a bracket 47, which is fixed, along with a stop-plate 48, to the tank B', said plate 48 lying in the path of the outer arm of said lever 45 to limit the downward movement thereof. The inner arm of the lever 45 is lifted by a spring 45ᵃ, and it is pivoted to a short link 49, which is fitted into the hook-shaped end of the arm 50, the latter being made fast to the cross-bar of one of the equalizer-bails 7 for the platform. The link is kept in engagement with the hook of the arm by a spring-latch 51, that may be adjusted to release the link and allow it to be moved free of the arm 50, thus releasing the bail and the platform from connection with the visual-indicator-operating mechanism for the purpose of removing the platform from the refrigerator.

As shown by Figs. 2 and 4, each pressure-bail and the spring therefor may be made in one piece; but in Fig. 8 we have shown the bail and the spring made in two separate pieces, in which event the arms of the bail are connected by the roller 17. The free ends 18 of the spring or springs bear against the tray or tank, and when the platform is removed the springs press the arms or bails upwardly against the ends of the tank, so that the bails or arms 16 are out of the way in cleaning the refrigerator.

The side arms and the segments of the equalizer-bails 7 8 are protected from the load on the platform by the guards or plates 52, each having a flanged lower end that is held on the bottom of the ice-tank by a clip 53, the upper reduced end of each guard being engaged by a catch 54, fastened to the inside of the tank, whereby the guard is held in place, and it may be removed for easy access to the bails in cleaning the refrigerator.

The construction shown in Figs. 6 to 8, inclusive, allows the operating devices for the indicator to be dropped a considerable distance below the ice-tank, the indicator to be located below the door and the operating devices to be located at one corner of the platform on the outside of the ice-tank. The gears 37 43 provide a multiplying connection between the indicator-shaft and the platform, which is effective in operating the pointer, while allowing the platform to have such a limited travel as to avoid interference with the ice in placing it in the refrigerator through the front door-opening thereof.

The platform is held in a level position by the intergeared equalizer-bails and in a raised position by the spring balance afforded by the springs and the pressure-bails, the same being effective in raising the platform when it is unloaded, so that the transmitting devices will be operated to make the pointer indicate zero on the scale. By depositing a cake of ice on the platform the latter is forced down, and along with it the bails, the transmitting devices being operated to rock or turn the pointer-pin and the pointer to make the latter indicate the weight on the dial. For removing the platform the operator lifts it to the dotted-line position of Fig. 3, and the arm 26 or the link 49 is disconnected, thus raising the equalizer-bails and withdrawing the clips 11 from engagement therewith, whereby the platform can be withdrawn and the springs become effective in forcing the pressure-bails against the ends of the ice-tank, thus allowing easy access to all the parts for cleaning the same.

Changes in the form, minor details of construction, size, and proportion of parts may be made without departing from the spirit or sacrificing the advantages of our invention. We therefore reserve the right to make such modifications as fairly fall within the scope of the invention as defined by the annexed claims.

Having thus fully described our invention, what we claim as new, and desire to secure by Letters Patent, is—

1. The combination of a load-platform, equalizer devices connected with the respective end portions of said platform, a counterpoise opposing the descent of the platform, a visual indicator independent of said counterpoise, and transmitting devices controllable by the platform for operating said indicator; said platform having removable relation to the transmitting devices.

2. A refrigerator having an ice-chest, equalizer-bails pivotally mounted in said chest at points adjacent to one another and adapted to be turned therein to upright positions, a platform, means for connecting the platform removably and pivotally to said bails, a counterpoise for the platform, and a visual indicator operated by the rising-and-falling movement of the platform.

3. The combination of a load-platform, equalizer devices coöperating with the respective end portions of the platform, a counterpoise opposing the descent of the platform, and an indicator independent of the counterpoise; said indicator being provided with a train of transmitting devices, one of which has detachable operative engagement with said equalizer devices.

4. A refrigerator having a load-platform in an ice-chamber thereof, connected bails on which the platform is supported for up-and-down movement in said chamber, a counterpoise independent of said bails and acting on the platform in opposition to its downward movement, and an indicator installed and operating independently of the counterpoise and controllable by the up-and-down travel of the platform; said platform being removable at will from the bails without disturbing the indicator.

5. The combination of pivoted bails connected for equal movement, a platform having detachable connection with the bails, said bails being withdrawable from engagement with the platform by turning the bails to upright positions, a counterpoise for the platform, and a visual indicator operated by the rise and fall of the platform.

6. A refrigerator weighing mechanism having a platform, equalizer devices therefor, a balance having spring-arms engaging with the platform, a visual indicator, and transmitting devices for actuating the indicator on the vertical travel of the platform.

7. A weighing mechanism having a platform, equalizer devices therefor, balance-springs having rolling engagement with the platform, a visual indicator, and means for actuating said indicator.

8. A weighing mechanism having a platform, equalizer devices therefor, balance-springs having bails or arms engaging with the platform, and permitting removal of the latter at will, a visual indicator, and means for actuating the indicator on the vertical travel of the platform.

9. The combination with an ice-chest of equalizer-bails pivoted therein and intergeared for equal movement, a platform having pivotal and detachable engagement with the bails, said bails being withdrawable from engagement with the platform by turning the bails to upright positions, counterpoising means for the platform, and an indicator arranged to be actuated by the rise and fall of the platform.

10. A weighing mechanism having a platform, intergeared equalizer-bails removably connected to said platform, spring-actuated balance arms or bails engaging with the platform, and an indicator controllable by the platform.

11. A weighing mechanism having a platform provided on its upper side with drainage-gutters, balance-springs having traveling engagement with the under side of the platform, means for equalizing the travel of the platform, and an indicator controllable by the movement of the platform.

12. A weighing mechanism having a platform, a rod or arbor, a rock-shaft, springs fitted on the arbor and the shaft and having arms which have rolling engagement with the platform, an indicator, and means for actuating the shaft and a movable element of the indicator by the travel of the platform.

13. A refrigerator equipped with a weighing mechanism comprising pivoted bails, a platform carried by said bails and removable from the bails by swinging them upwardly, a counterpoise for the platform, an indicator-shaft, a visual indicator, and transmitting devices between one of said bails and said indicator-shaft for rotating the latter on the up-and-down travel of the bail with the platform.

14. A refrigerator provided with an ice-chamber, a load-platform therein, equalizer devices within said chamber and coöperating with the respective end portions of said platform, a counterpoise, an indicator-shaft located outside of the chamber and extended through the refrigerator, means for supporting said shaft, and devices for rotating the shaft by the travel of the platform; said devices having detachable engagement with one of the equalizer devices for permitting the removal of the platform at will.

15. A refrigerator having an ice-chamber and equipped with a weighing mechanism comprising pivoted bails connected operatively for equal movement, a platform supported by the bails, a counterpoise, a visual indicator including a shaft located adjacent to a lower corner of said ice-chamber, and transmitting devices operated by one of said bails for rotating the shaft of said indicator.

16. A refrigerator provided with an ice-chest, a load-platform therein, equalizer devices within said chamber and in coöperative relation to the platform, a counterpoise for said platform, a shaft-support located externally of said chamber, an index-shaft carried by said support and extended through the refrigerator, and a train of transmitting devices for rotating the index-shaft by the movement of the platform; said transmitting devices including a lever which extends through the ice-chamber and is adapted to be operated by the travel of the platform.

17. The combination of an ice-chamber, a shaft-support outside of said chamber, a load-platform within the chamber, a counterpoise for the platform, a lever passing through the chamber and having one portion thereof in operative relation to the platform, and devices between said lever and the index-shaft for rotating the latter on the up-and-down movement of the platform.

18. A refrigerator having an ice-chest and equipped with a weighing mechanism comprising a load-platform, a counterpoise, a hanger depending below the ice-chest, a visual indicator supported partly by the hanger, and devices operated by the platform for actuating the indicator.

19. The combination with an ice-tank, of a hanger attached thereto, a platform in said tank, a visual indicator, a lever having operative connection with the platform, an indicator-shaft journaled in the hanger, and another lever geared to said shaft and linked to the first-named lever.

In testimony that we claim the foregoing as our invention we have hereunto signed our names in the presence of two subscribing witnesses.

JOHN B. SALO.
ANDREW H. HOAG.

Witnesses:
H. I. BERNHARD,
R. B. CAVANAGH.